(12) United States Patent
Tanaka et al.

(10) Patent No.: US 6,353,491 B1
(45) Date of Patent: Mar. 5, 2002

(54) OPTICAL COMMUNICATION MODULE

(75) Inventors: Haruo Tanaka; Jun Ichihara, both of Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/136,957

(22) Filed: Aug. 20, 1998

(30) Foreign Application Priority Data

Aug. 26, 1997 (JP) .............................................. 9-229393

(51) Int. Cl.[7] .............................................. H04B 10/00
(52) U.S. Cl. ........................ 359/152; 359/163; 257/81; 385/93
(58) Field of Search ................................ 359/152, 143, 359/163, 113; 257/81; 385/93

(56) References Cited

U.S. PATENT DOCUMENTS

| | | | | |
|---|---|---|---|---|
| 4,880,289 A | | 11/1989 | Imoto et al. ............. | 350/96.18 |
| 5,416,624 A | | 5/1995 | Karstensen ............... | 359/114 |
| 5,528,407 A | * | 6/1996 | Nakata et al. ............ | 359/152 |
| 5,530,578 A | | 6/1996 | Takemoto et al. ......... | 359/152 |
| 5,535,034 A | * | 7/1996 | Taniguchi ................. | 359/152 |
| 5,555,334 A | | 9/1996 | Ohnishi et al. ........... | 385/93 |
| 6,130,444 A | * | 10/2000 | Hashizume et al. ........ | 257/81 |
| 6,188,495 B1 | * | 2/2001 | Inoue et al. .............. | 359/152 |

* cited by examiner

Primary Examiner—Kinfe-Michael Negash
(74) Attorney, Agent, or Firm—Arent Fox Kintner Plotkin & Kahn PLLC

(57) ABSTRACT

An optical communication module comprises a light emitting element for generating the transmission signal, a condenser lens for connecting the transmission signal light from the light emitting element to the light transmission line, a light receiving element for receiving the receiving signal light from the light transmission line, and a package that covers the light emitting element and the light receiving element, and uses the condenser lens as an opening window, wherein the wavelength selective film for allowing the required waveband light to transmit and the unwanted waveband light to reflect is coated on the transparent member installed on or in the vicinity of the convex surface of the condenser lens. As a result, a bi-directional optical communication module of an inexpensive construction can be obtained, which can receive the desired waveband light only without using a special component such as a wave separator and does not return the unwanted waveband light to the light transmission line.

10 Claims, 5 Drawing Sheets

OPTICAL COMMUNICATION MODULE

BACKGROUND OF THE INVENTION

1. Field of the Invention

The present invention relates to an optical communication module used for optical communication, etc. using optical fibers, and more specifically, to an optical communication module with a construction in which the light of a waveband other than a required waveband is not allowed to be incident on the light receiving element and the light of unwanted waveband is not returned to the optical transmission line.

2. Description of the Prior Art

The conventional bi-directional optical communication module comprises, for example, as shown in FIG. 6, a light emitting element 21 such as semiconductor laser, etc. for generating transmission signal light, a light receiving element 22 such as a photodiode, photo-transistor, etc. for receiving the receiving signal light via a half mirror 23, a condenser lens 24 for connecting transmission signal light reflected by a half mirror 23 to a optical transmission line 25 such as optical fibers, a light transmission line 25 for transmitting converged light, and a wave separator 26 for reflecting the unwanted waveband light. This light emitting element 21, light receiving element 22, and half mirror 23 are covered with an unillustrated package and a condenser lens 24 serves as an opening window to connect with the light transmission line 25. Under this configuration, the transmission signal light from the light emitting element 21 reflects against the half mirror 23 and is incident on the light transmission line 25 and sent to the counterpart. When the signal sent from the counterpart is received, the receiving signal light penetrating the half mirror 23 from the light transmission line 25 is received by converting it into an electrical signal by the light receiving element 22 and optical communication takes place. In such event, transmission and reception are switched over alternately by time division, and interference between the two does not occur.

For the regular optical communication, the 1.3 $\mu$m band light is used but in the light transmission line 25, the 1.55 $\mu$m band light for broadcasting or equipment check are frequently mixed at the same time. In such event, in the regular optical communication, the 1.55 $\mu$m band light is not wanted and work as an interfering light. Consequently, as shown in FIG. 4, in general, a wave separator 26 comprising an interference filter or multilayer film is inserted before a module to remove the 1.55 $\mu$m band light.

As described, when a wave separator for removing the unwanted waveband light is used, the number of parts increases and cost increases as well as the module size increases.

The coating film may be provided on the surface of the half mirror 23 to form the filter, and the 1.55 $\mu$m band light may be reflected, but there are problems in that when the light is reflected with the half mirror, the unwanted 1.55 $\mu$m band light repeats irregular reflections in a package and returns to the light transmission line 25 and gives noise to the case in which the 1.55 $\mu$m band light is being used, or enters the light receiving element 22 and causes noise to enter the receiving signal.

SUMMARY OF THE INVENTION

It is an object of this invention to provide an optical communication module which can receive light of a required waveband only without using a special component such as a wave separator and at the same time which has an inexpensive structure to prevent the light of an unwanted waveband from returning to the light transmission line.

The optical communication module according to this invention comprises a transparent member for allowing the light from the light transmission line to transmit, a light receiving element for receiving light passing the transparent member, and a package for covering the light receiving element and using the transparent member as an opening window, wherein on one surface of the transparent member, a wavelength selective film for allowing the light of a required waveband to transmit and reflecting the light of an unwanted waveband is coated.

Now, the light transmission line referred to herein means a medium which can transmit the light such as optical fiber core. And the transparent member means a medium for allowing the light from the light transmission line, such as a condenser lens (rod lens), window glass, etc. to transmit.

With this configuration, the light of the waveband not required for optical communication such as the 1.55 $\mu$m band is reflected at one surface of a transparent member near the outer surface side of the package, and has less chance to reflect in the package to reach the light receiving element, and enables the reception of a required waveband with less noise. And if the wavelength selective film is not formed at the focal point of the receiving signal light beam, the reflected light neither returns to the light transmission line as it is nor allows the light of the unwanted waveband to return to the light transmission line.

Specifically, the transparent member formed with the material having the practically same refraction factor as that of the light transmission line is installed in such a manner to come in contact with the light transmission line, and the wavelength selective film is coated on the surface of the transparent member opposite to the light transmission line; or the transparent member is located with a specified clearance provided with the light transmission line, and on the surface of the transparent member on the light transmission line side, the wavelength selective film is coated.

Now, the practically same refraction factor referred to herein is that the refraction factor is close to such a level that the reflection causing problems does not occur on the interface.

When the transparent member is brought in contact with the light transmission line, it is preferable that the transparent member comprises a rod lens and the wavelength selective film formed surface of the rod lens is formed in a curvature so that the light reflected by the wavelength selective film returns into the rod lens, because the light of the unwanted waveband can be reflected outside the package such as the outer circumferential side from the optical fiber core without allowing the reflection light to return to the light transmission line.

It is preferable that the transparent member is a condenser lens because light can be condensed to the light receiving element.

It is preferable that the surface to which the wavelength selective film is formed is a curvature, because the reflected light is difficult to return to the light transmission line.

It is preferable that a light absorbing material is installed in the package so that the light reflected by the wavelength selective film does not scatter in the package, because even when the light of the unwanted waveband is reflected in the package, it does not make multiple reflection and is difficult to reach the light receiving element.

It is preferable that the wavelength selective film is installed on the outer surface side of the package to prevent the light reflected by the wavelength selective film from entering the package, because the reflected light is difficult to enter the package.

If the second transparent member equipped with the wavelength selective film is installed between the transparent member and the light receiving element, it is possible to further eliminate the light of the unwanted waveband.

An optical transmission module that can carry out bi-directional communication of transmission and reception can be obtained by further having a light emitting element within the package.

A specific bi-directional optical transmission module according to this invention comprises a light emitting element for generating transmission signal light, a condenser lens for connecting the transmission signal light from the light emitting element to the light transmission line, a light receiving element for receiving the receiving signal light from the light transmission line, and a package which covers the light emitting element and the light receiving element and uses the condenser lens as an opening window, wherein to the transparent member installed to or in the vicinity of the convex surface of the condenser lens, a wavelength selective film which allows the light of a specified waveband to transmit and reflects the light of the unwanted waveband is provided.

Now, the vicinity of the convex surface of the condenser lens referred to herein means a distance which is less than one half the distance from the condenser lens to the light emitting element or the light receiving element.

Even with this configuration, the light of the waveband not required for optical communication such as the 1.55 $\mu$m band reflects on or in the vicinity of the condenser lens and reflects to the light transmission line side. However, since the light does not reflect upon the focal point of the condenser lens, the beam reflecting direction is changed at the convex surface of the condenser lens and does not return to the center portion of the light transmission line. Consequently, the light reflects to the light transmission line side and does not enter the light transmission line, and repeats irregular reflections with the surrounding of the light transmission line and does not enter the light transmission line or light receiving element.

DETAILED DESCRIPTION OF THE PREFERRED EMBODIMENTS

Figure 1:
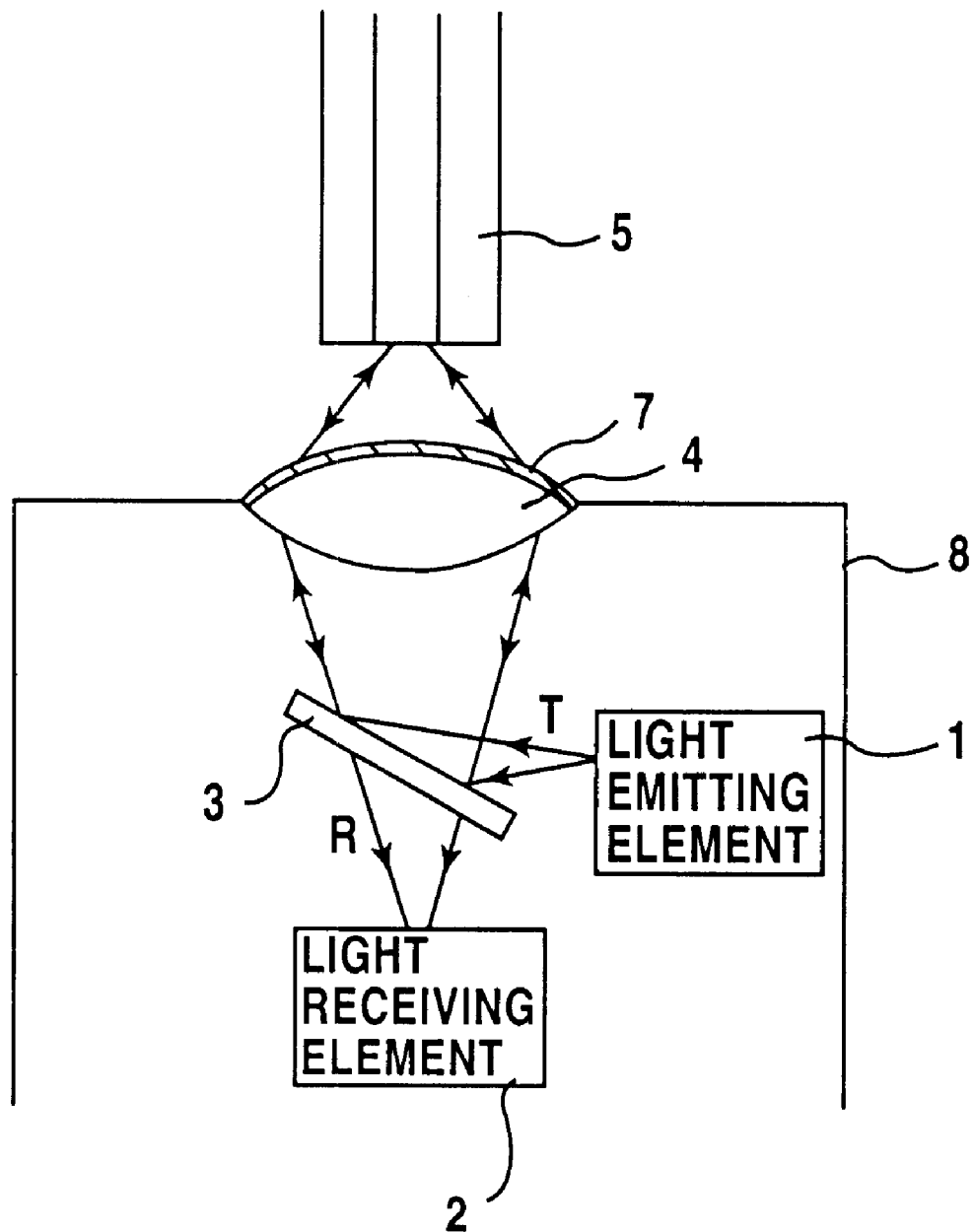
FIG. 1 is an illustration explaining the concept of one embodiment of the bi-directional optical communication module according to this invention.

An optical communication module according to this invention comprises, as shown in FIG. 1 in which a conceptual drawing of one embodiment is shown, a light emitting element 1 for generating transmission signals, a condenser lens 4 which is a transparent member for connecting the transmission signal light T from the light emitting element 1 to the light transmission line 5, a light receiving element 2 for receiving the receiving signal light R from the light transmission line 5, such as, for example, an optical fiber core, and a half mirror 3 for allowing the transmission signal light T to reflect to the light transmission line 5 side and the receiving signal light R to transmit to the light receiving element 2 side. And on the convex surface of the condenser lens 4, a wavelength selective film 7 for allowing a desired waveband light to transmit and the unwanted waveband light to reflect is coated, and a package 8 that covers the light emitting element 1 and the light receiving element 2 and uses the condenser lens 4 as an opening window is installed.

The example shown in FIG. 1 is an example of bi-directional optical communication module having a light emitting element 1, but if at least, a light receiving element 2 is equipped, an optical communication module for receiving signals can be configured, and the light emitting element is not always required for this invention. As a light transmitting member, a condenser lens is used. The condenser lens is preferable because it is able to focus beams better and connect efficiently, but this invention is not limited to the condenser lens. In addition, as is the case of the example shown in FIG. 1, when the light transmission line 5 and the condenser lens 4 are installed with a clearance provided, it is needless to say that a nonreflective film is coated at the termination of the light transmission line 5 to prevent light from reflecting at the end face.

The wavelength selective film 7 is formed with multilayer film, such as $SiO_2$, $SiN$, $Al_2O_3$, etc. and the light of wavelength other than the required waveband is reflected by the refraction factor and thickness of each film. For example, by combining the refraction factors and thickness, the film is formed in such a manner that the 1.55 $\mu$m band light is reflected, and he 1.3 $\mu$m band light is allowed to transmit. The coating film 7 comprising these multilayer film is formed on the convex surface of the condenser lens 4. In the example shown in FIG. 1, on the convex surface outside the condenser lens 4, the coating film 7 is formed, but it may be formed on the convex surface inside the package 8.

Figure 2:
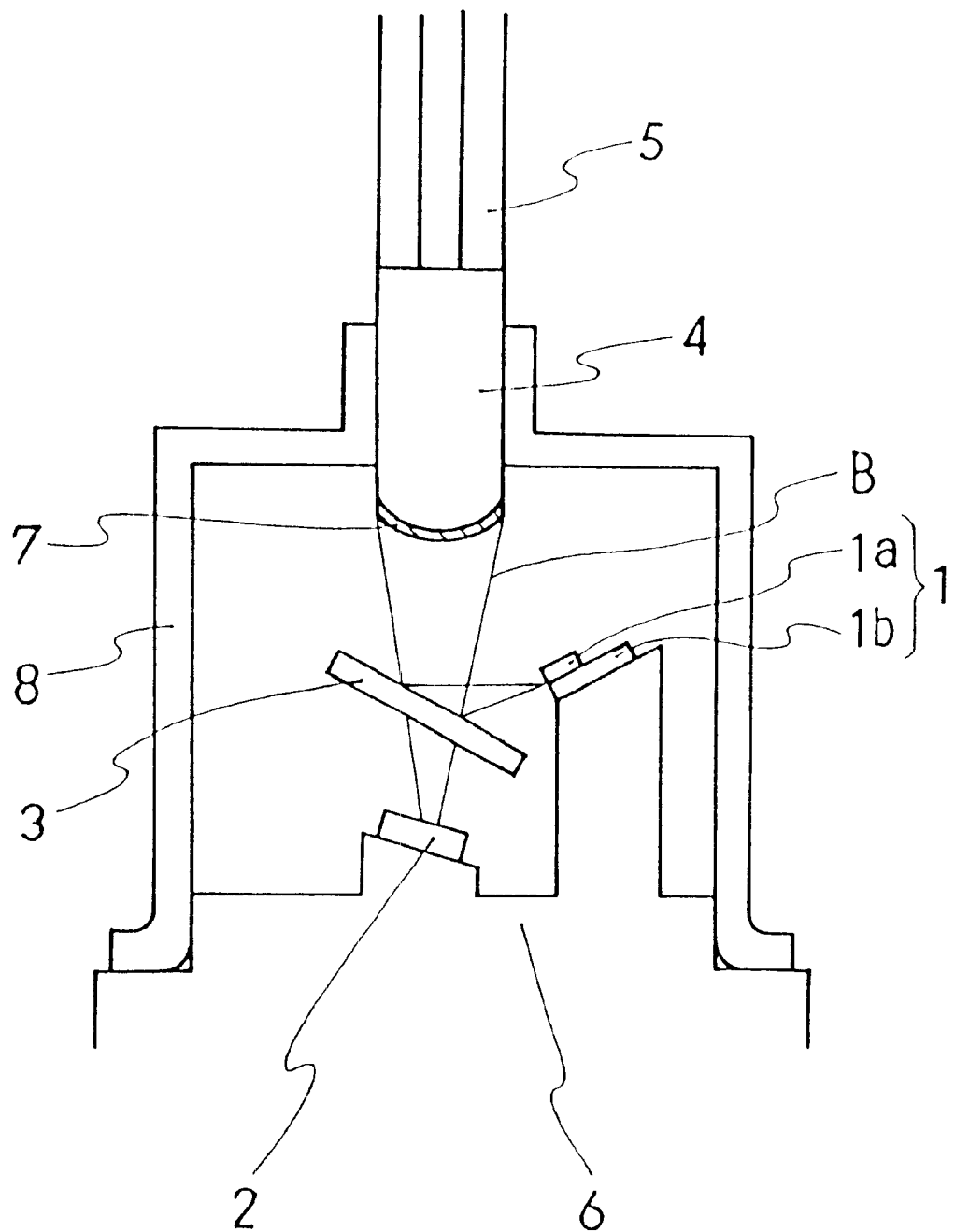
FIG. 2 is an illustration explaining the construction of a specific example of one embodiment of the bi-directional optical communication module according to this invention.

FIG. 2 shows a specific structural example. This example is formed by press molding from iron, etc. and to a stem 6 with a lead not illustrated fixed with glass, etc., a light emitting element 1 and a light receiving element 2 are mounted, and the half mirror 3 is also fastened to the stem 6, though not illustrated. And a package 8 which has a condenser lens i.e. a rod lens 4 at the center portion of the top is fixed to the stem 6 in such a manner to cover the surrounding. The rod lens 4 has a nearly flat surface on the side of the optical transmission line 5 so that it is butt-fixed to the light transmission line 5 and inside the package 8, the convex surface is formed. And on the convex surface in the package 8, a wavelength selective film 7 is formed. By the way, in the example of FIG. 2, the rod lens 4 is about 1.5 mm$\phi$ thick (in diameter), about 10 mm long, and about 2.7 mm distant from the convex surface of the rod lens 4 and light receiving element 2, and the light transmission line (fiber core) 5 is about 10 $\mu$m in diameter in terms of single mode fiber and about 50 $\mu$m in terms of multi mode fiber. Character B designates the beam of the transmission signal light and receiving signal light as in the case of FIG. 1. In addition, if the nonreflective coating film is provided on the end face of the light transmission line, the light transmission line and the rod lens may not be butted.

The light emitting element 1 is formed by fastening the semiconductor laser chip 1a for irradiating laser beam B from the light emitting surface, its end face, on a submount 1b composed of a silicon substrate, etc. The light receiving element 2 comprises, for example, photodiode, phototransistor, photocell, etc. And the light emitting element 1 and the light receiving element 2 are mounted to the optical axis of the rod lens 4 by fastening to the stem 6, respectively, with gold paste, etc. in such a manner that the light emitting surface and the light receiving surface are tilted at a specified angle. The reason why the light emitting surface and the light receiving surface must be mounted tilted at a specified angle with respect to the optical axis is that the receiving signal light from the light transmission line 5 does not reflect upon the light emitting surface or light receiving surface and does not return to the light transmission line again. Consequently, they should be tilted in such a manner that the reflected light does not enter the rod lens 4.

According to the optical communication module of this invention, because a wavelength selective film 7 for allowing the light of a desired waveband to transmit and the light of an unwanted waveband to reflect is provided on the convex surface of the condenser lens, the light of an unwanted waveband is reflected at the wavelength selective film 7. Since the reflection surface is located on the condenser lens surface, in general, it is not vertical to the light travel direction (optical axis) and the light reflects in the direction different from the direction in which the light comes to the reflection surface. That is, when the wavelength selective film is located, for example, on the flat surface side of the rod lens of FIG. 2, the light reflects vertically in the light travel direction, and the light returns to the initial direction and returns to the light transmission line 5, but since it is also reflected on the convex surface or concave surface, the light reflect in the direction different from the light transmission line. Even if the light returns to the light transmission line 5, it scarcely enter the core of the center portion. As a result, the light does not generate noise on other signal receiver sides by returning to the light transmission line 5. In particular, in the case of the single mode fiber, since the incidence angle which can transmit even when irregular reflection light enters the core is limited, the light is scarcely transmitted.

Now, discussion will be made on the ratio at which the light reflected on the lens curvature returns to the light transmission line. First of all, investigation will be made on from how much range of a radius from the center line of the lens curvature the reflected light returns to the light transmission line.

Figure 3A:
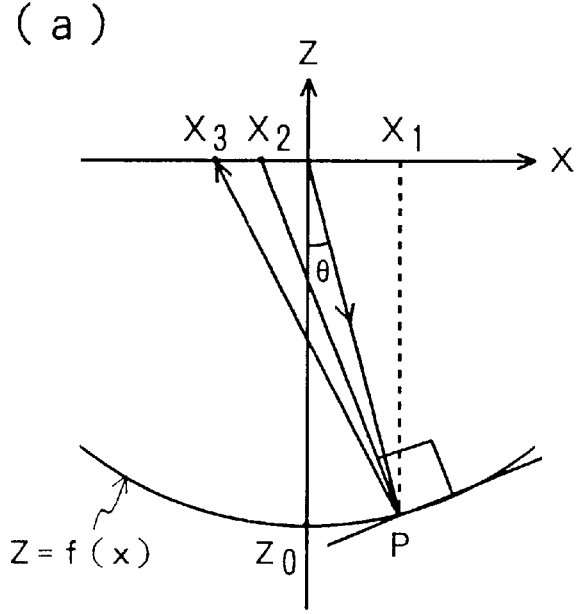
FIGS. 3(a) and 3(b) are illustrations for computation on the ratio of reflected light by the lens curvature to return to the optical fiber.

As shown in FIG. 3(a), let z=f(x) denote the lens curvature and $x_3$ denote the coordinate on the x-axis of the light reflected on the curvature of the point P of $x=x_1$, the light in the case of $x_3=5$ μm or less returns to the light transmission line because the core diameter is 10 μm when the single mode fiber is used for the light transmission line. The formula of the normal line at point P is given as follows:

$$z - f(x_1) = \{-1/f'(x_1)\} \cdot (x - x_1)$$

and letting $x_2$ denote the coordinate of the normal line of the point p on the x-axis, then, $$x_2 = f(x_1) \cdot f'(x_1) + x_1, \quad x_3 \approx 2 \cdot x_2$$

and since the lens design can be obtained by the following equation (A, B, C, k are constants, R a radius of the curvature and about 0.9 mm, and $z_0$ length of a rod lens and about 10 mm), $$f(x) = \frac{x^2}{R(1 + \sqrt{1 - (1+k)x^2/R^2})} + Ax^4 + Bx^6 + Cx^8 + z_0$$

If $x_3=0.005$ mm, $x_1=0.00025$ mm. That is, when the light coming out from the fiber reflects upon the lens surface, the light striking the portion in the radius r=0.255 μm or less from the lens centerline only returns to the fiber (fiber core).

Figure 3B:
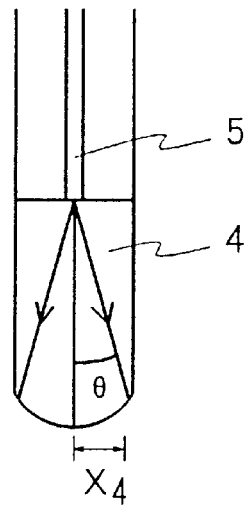

Then, investigation is made on the ratio at which the light returns to the fiber. If the number of fiber openings NA is 0.095, the intensity of the light coming out from the fiber is uniform on the curvature of the rod lens and irradiates the range in the beam radius $x_4$ of the curvature of the 10 mm long rod lens 4 shown in FIG. 3(b). when $$NA = n \cdot \sin \theta, \text{ and } n=1.486,$$

$$x_4 \approx \tan\theta = 0.641 \text{ (mm)}$$

$$\frac{2\pi r^2}{2\pi x_4^2} = \frac{(0.255 \mu m)^2}{(0.641 \text{ mm})^2} = 158 \times 10^{-9} = -68 \text{ dB}$$

That is, the rate for the light reflecting upon the curvature of the lens surface and returning to enter the fiber is −68 dB, far smaller than −35 dB of the specification. In this computation, the beam intensity is assumed to be uniform on the curvature, but even if the intensity is distributed at the center in accordance with the large Gaussian distribution, it becomes about −58 dB, though the computation process is omitted, and it has been confirmed that even if the 1.55 μm waveband light is reflected upon the lens curvature, the light is connected to the optical fiber and does not serve as the noise source.

On the other hand, because to the light receiving element 2 side of the module, the light is filtered with the coating film 7 and the light of the desired waveband only enters, the light can be received at a high SN ratio. In addition, because the unwanted waveband light is reflected before entering the package 8, it does not make irregular reflections in the package and will not enter the light receiving element 2. The desired waveband light reflected on the light emitting surface and the light receiving surface of the light emitting element 1 and the light receiving element 2 may make irregular reflections in the package, but since it is a signal light, it scarcely causes noise problems to the light receiving element 2. In addition, because it is irregularly reflected, it is condensed with the lens and the ratio of returning to the light transmission line 5 is extremely small, causing no problem.

Figure 4:
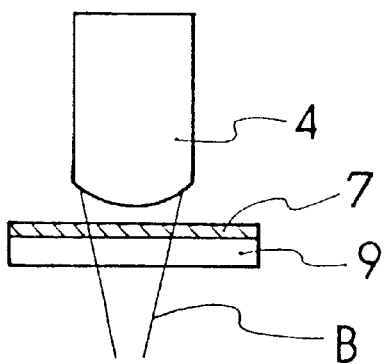
FIG. 4 is an illustration showing a variation of the example of FIG. 2.

In the foregoing example, the wavelength selective film 7 is provided on the convex surface of the condenser lens 4, but when the reflection film is provided on the focal surface at which the light is condensed with the condenser lens 4, the light returns to the optical path as it is through which it traveled and returns to the light transmission line 5, but if the light is allowed to reflect upon the surface different from the focal surface, the optical path reflected by the condenser lens is not at right angles to the coating film, and the light reflects in different directions at certain reflection angles. Consequently, as shown in FIG. 4, even if the coating film 7 is provided on the surface of the transparent member 9 located in the vicinity of the convex surface of the rod lens 6, the reflected light of the unwanted waveband enters the rod lens 4 as it is if it is close to the rod lens 4, but it differs from the path through which it traveled and is not connected to the light transmission line 5. Consequently, the coating film 7 may not be located on the convex surface of the condenser lens but may be located in the vicinity of the convex surface. In such event, as the distance from the rod lens 4 to the coating film 7 become large, the unwanted waveband light reflected upon the coating film 7 has a danger of not returning to the rod lens 4 but repeating irregular reflection in the package 8 and entering the light receiving element 2, and it is, therefore, preferable for the rod lens to be located as close as possible to the coating film. At least, the distance is preferable to be less than one half the optical path from the rod lens 4 to the light emitting element 1 or the light receiving element 2.

Figure 5A:
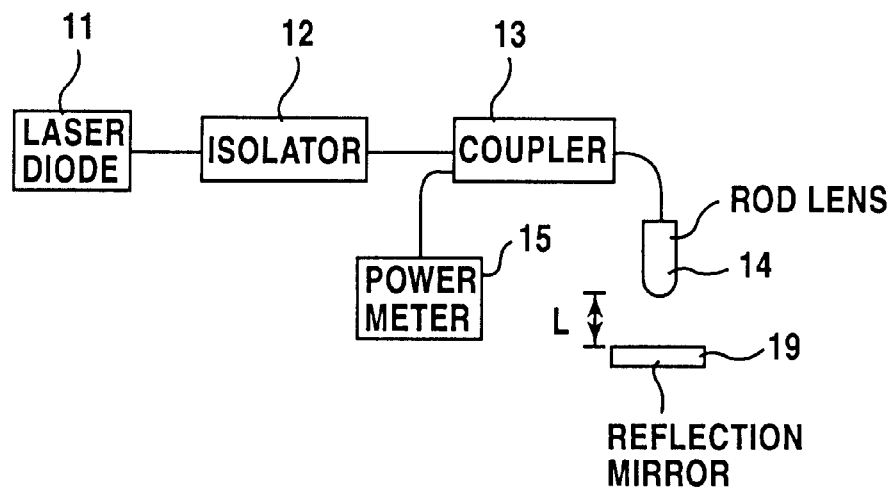
FIGS. 5(a) and 5(b) are illustrations of return loss rate by positions from the rod lens of a flat plate mirror.
Figure 5B:
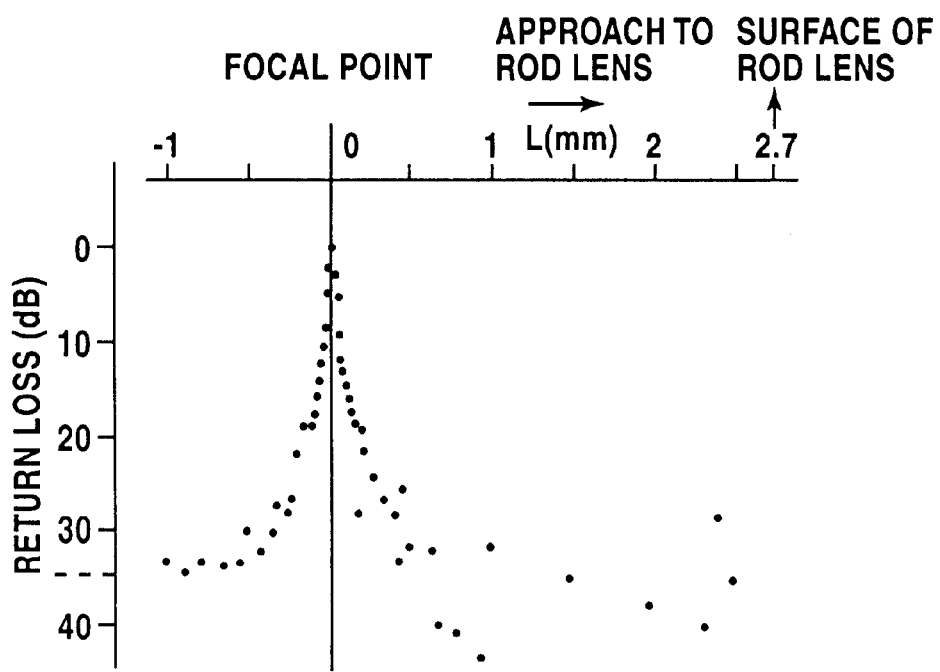
Figure 6:
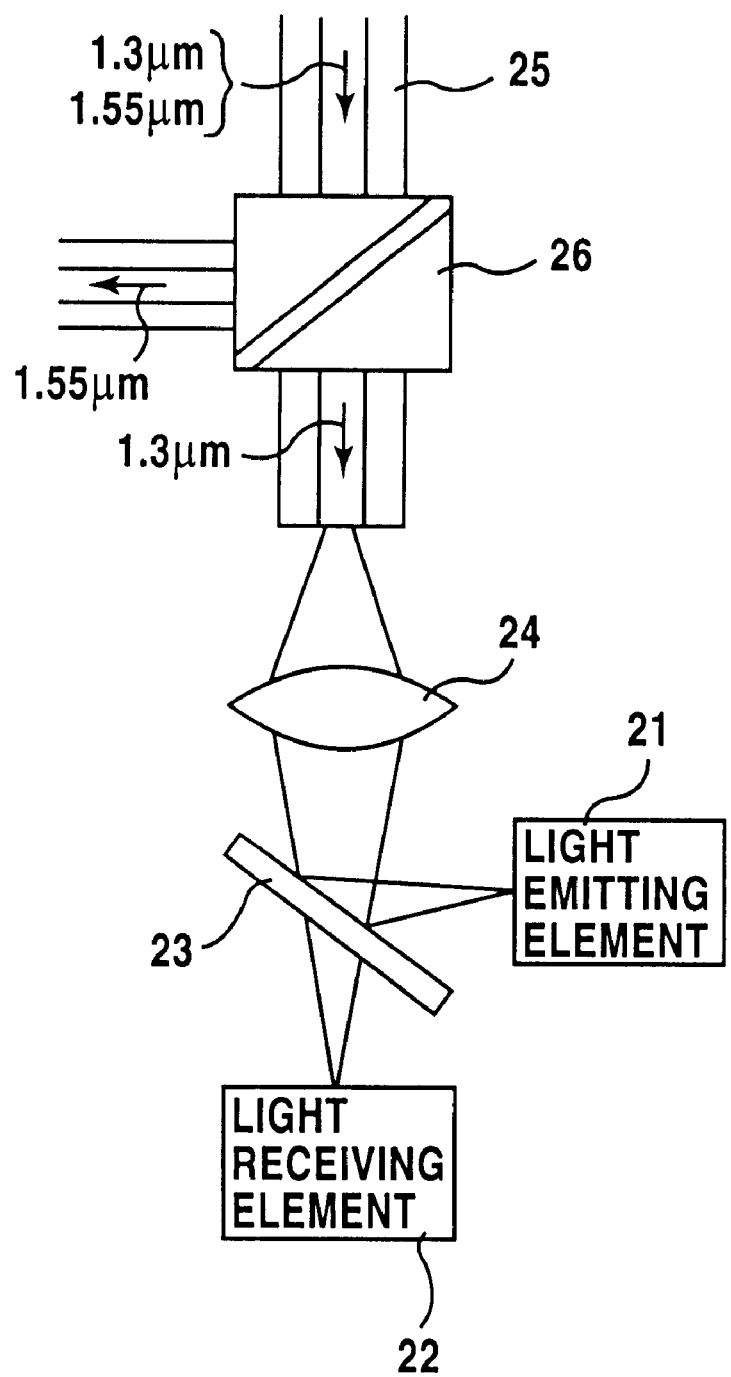
FIG. 6 is an illustration of one example of a conventional bi-directional optical communication module.

In front of the rod lens, a plane type total reflection mirror is located, and as sown in FIG. 5(a), the isolator 12 and the coupler 13 are connected across the laser diode 11 and the rod lens 14, and the intensity of the reflected light is measured with a power meter 15 via a coupler 13, and the return loss was investigated when the position of the total reflection mirror 19 is varied in many manners. The results are shown in FIG. 5 (b). As shown in FIG. 5(b), when the total reflection mirror 19 is located at the position of the focal point of the rod lens 14 (L=0), the return loss is nearly zero, and as the mirror approaches to the surface of the rod lens 14, the return loss increases and enters nearly the range of 35 dB of the specification. However, there are cases in which the return loss is less than 35 dB and the return loss is small depending on the reflection angles even in measured values, and in order to positively secure 35 dB or more, it is preferable to provide a reflection film of about 10 dB on the curvature of the rod lens 14. It is difficult to coat the wavelength selective film for reflecting the unwanted waveband light more than 35 dB on the curvature, but the wavelength selective film of about 10 dB can be easily provided, and by using the film in combination with the wavelength selective film provided on this plane, high-performance wavelength selective film can be easily obtained.

In addition, in the above-mentioned example, the transmission signal light and the receiving signal light were separated with a half mirror, but this is same with the construction in which the transmission signal light is reflected on the light receiving surface of the light receiving element and is connected to the condenser lens or the construction in which the receiving signal light is reflected on the light emitting surface of the light emitting element and the light is received with the light receiving element.

In each of the above-mentioned examples, it is possible to absorb the reflected unwanted waveband light by providing the light absorbing member such as applying the black paint to the package inside or the end around the light transmission line, which is preferable because a fear of the light to stray in the light transmission line or light receiving element by multiple reflections can be eliminated. Other examples of light absorbing member include black plastic, coating with black material, and so on. In addition, it is possible to further prevent the light from straying in the light transmission line by forming the curvature in such a manner that the light reflecting upon the surface on which the wavelength selective film is provided does not return to the light transmission line but return to the surrounding.

According to this invention, because the coating film for allowing the desired waveband light to transmit and the unwanted waveband light to reflect is provided on or in the vicinity of the convex surface of the condenser lens comprising the optical communication module, an inexpensive optical communication module for cutting the unwanted waveband light without using an expensive wave separator and returning the unwanted waveband light to the light transmission line to prevent noise from being generated on other receiver sides.

Although preferred example have been described in some detail, it is to be understood that certain changes can be made by those skilled in the art without departing from the spirit and scope of the invention as defined by the appended claims.

What is claimed is:

1. An optical communication module comprising:
   a transparent member to be connected with a light from a light transmission line;
   a light receiving element for receiving said light passing said transparent member;
   a package which covers said light receiving element and uses said transparent member as an opening window;
   a wavelength selective film for allowing a desired waveband light to transmit and an unwanted waveband light to reflect; and
   wherein said transparent member made with a material having a practically same refraction factor as that of said light transmission line and is installed in contact with said light transmission line and said wavelength selective film is coated on a surface of said transparent member opposite to said light transmission line.

2. An optical communication module according to claim 1, wherein said transparent member comprises a rod lens and a surface of said rod lens on which said wavelength selective film is provided is formed in a curvature so that a light reflected by said wavelength selective film returns to said rod lens inside.

3. An optical communication module comprising:
   a transparent member to be connected with a light from a light transmission line;
   a light receiving element for receiving said light passing said transparent member; and
   a package which covers said light receiving element and uses said transparent member as an opening window; and
   a wavelength selective film for allowing a desired waveband light to transmit and an unwanted waveband light to reflect;
   wherein said wavelength selective film material is coated on an outer surface of said transparent member, said surface being outside of said package so that a light reflected by said wavelength selective film does not enter into said package.

4. An optical communication module according to claim 3, wherein said transparent member is installed with a specified clearance provided with said optical transmission line and said wavelength selective film is coated on a surface on said light transmission side of said transparent member.

5. An optical communication module according to claim 3, wherein said transparent member is a condenser lens.

6. An optical communication module according to claim 3, wherein said outer surface on which said wavelength selective film is formed is a curvature.

7. An optical communication module according to claim 1 or 3, wherein a light absorbing material is installed inside said package so that a light reflected by said wavelength selective film is not scattered in said package.

8. An optical communication module according to claim 3, wherein a second transparent member further having said wavelength selective film is installed between said transparent member and said light receiving element.

9. An optical communication module according to claim 3, wherein a light emitting element is installed in said package to carry out bi-directional communication.

10. A bi-directional optical communication module comprising:

a light emitting element for generating a transmission signal light;

a condenser lens for connecting said transmission signal light from said light emitting element to a light transmission line;

a light receiving element for receiving a receiving signal light from said light transmission line;

a package that covers said light emitting element and said light receiving element, and uses said condenser lens as an opening window; and a wavelength selective film for allowing the required waveband light to transmit and the unwanted waveband light to reflect;

wherein said wavelength selective film is coated on a surface of said condenser lens, said surface being outside of said package or wherein said wavelength selective film is coated on a transparent member, said transparent member being installed in the vicinity of a convex surface of said condenser lens and outside of said package.

* * * * *